US006226261B1

United States Patent
Hurtta et al.

(10) Patent No.: US 6,226,261 B1
(45) Date of Patent: May 1, 2001

(54) REDUNDANT SWITCHING ARRANGEMENT

(75) Inventors: Ari Hurtta; Antti Tuominen, both of Espoo; Markku Ruuskanen, Porvoo, all of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/649,360

(22) Filed: Aug. 28, 2000

Related U.S. Application Data

(63) Continuation of application No. PCT/FI99/00175, filed on Mar. 5, 1999.

(30) Foreign Application Priority Data

Mar. 6, 1998 (FI) ........................................................ 980516

(51) Int. Cl.[7] .............................. G06F 11/00; H04L 12/28
(52) U.S. Cl. .......................... 370/219; 370/216; 370/395; 370/244; 714/2
(58) Field of Search ..................................... 370/216, 217, 370/219, 220, 241, 244; 714/100, 1, 2, 3, 4

(56) References Cited

U.S. PATENT DOCUMENTS

| | | | |
|---|---|---|---|
| 4,413,335 | | 11/1983 | Clements et al. . |
| 4,535,442 | | 8/1985 | Maddern et al. . |
| 5,072,440 | * | 12/1991 | Isono et al. ............................ 370/220 |
| 5,274,633 | * | 12/1993 | Kato et al. ............................ 370/219 |
| 5,283,782 | * | 2/1994 | Takase et al. ........................ 370/219 |
| 5,301,184 | * | 4/1994 | Uriu et al. ............................ 370/219 |
| 5,663,949 | * | 9/1997 | Ishibashi et al. ..................... 370/220 |
| 5,909,427 | * | 6/1999 | Manning et al. ..................... 370/219 |

FOREIGN PATENT DOCUMENTS

| | | |
|---|---|---|
| 0 325 318 | 7/1989 | (EP) . |
| 3806262 | 7/1989 | (DE) . |
| WO 82/00232 | 1/1982 | (WO) . |

OTHER PUBLICATIONS

International Search report for PCT/FI99/00175.

* cited by examiner

*Primary Examiner*—Hassan Kizou
*Assistant Examiner*—Inder Pal Mehra
(74) *Attorney, Agent, or Firm*—Altera Law Group, LLC

(57) ABSTRACT

The invention relates to a redundant switching arrangement using a first and second switching network (SWF_A, SWF_B) or other switching element. The switching elements are used to carry out switching operations in the same way, so that one of the switching elements serves as an active switching element whose switching operations are utilised, while the other switching element serves as a passive switching element backing up the active switching element. To ensure that any faults occurring in the switching elements in such a redundant switching arrangement are detected as quickly as possible, their operation is monitored by comparing the data of the corresponding output channels of the first and second switching elements, and if such a comparison shows that the data contained in any of the corresponding output channels are not identical, an internal test is carried out for at least one of the switching elements to verify the data of the output channel involved. The internal compare test(s) is/are used as a basis for selecting the switching element to continue to serve as the active switching element.

10 Claims, 6 Drawing Sheets

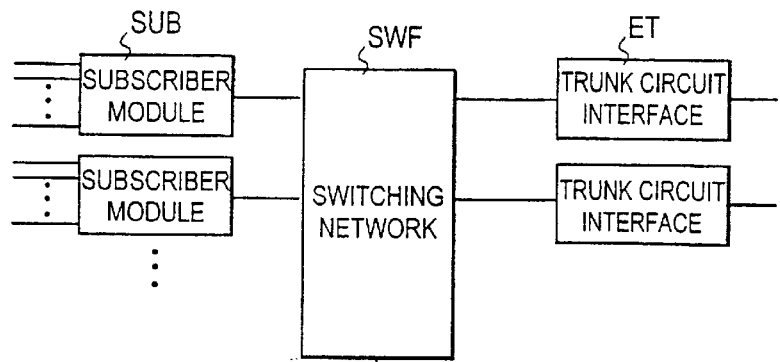
FIG. 4
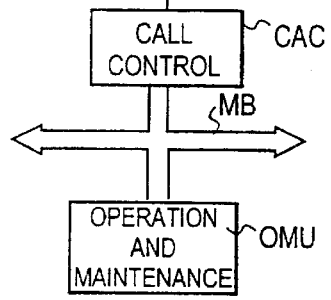
FIG. 5
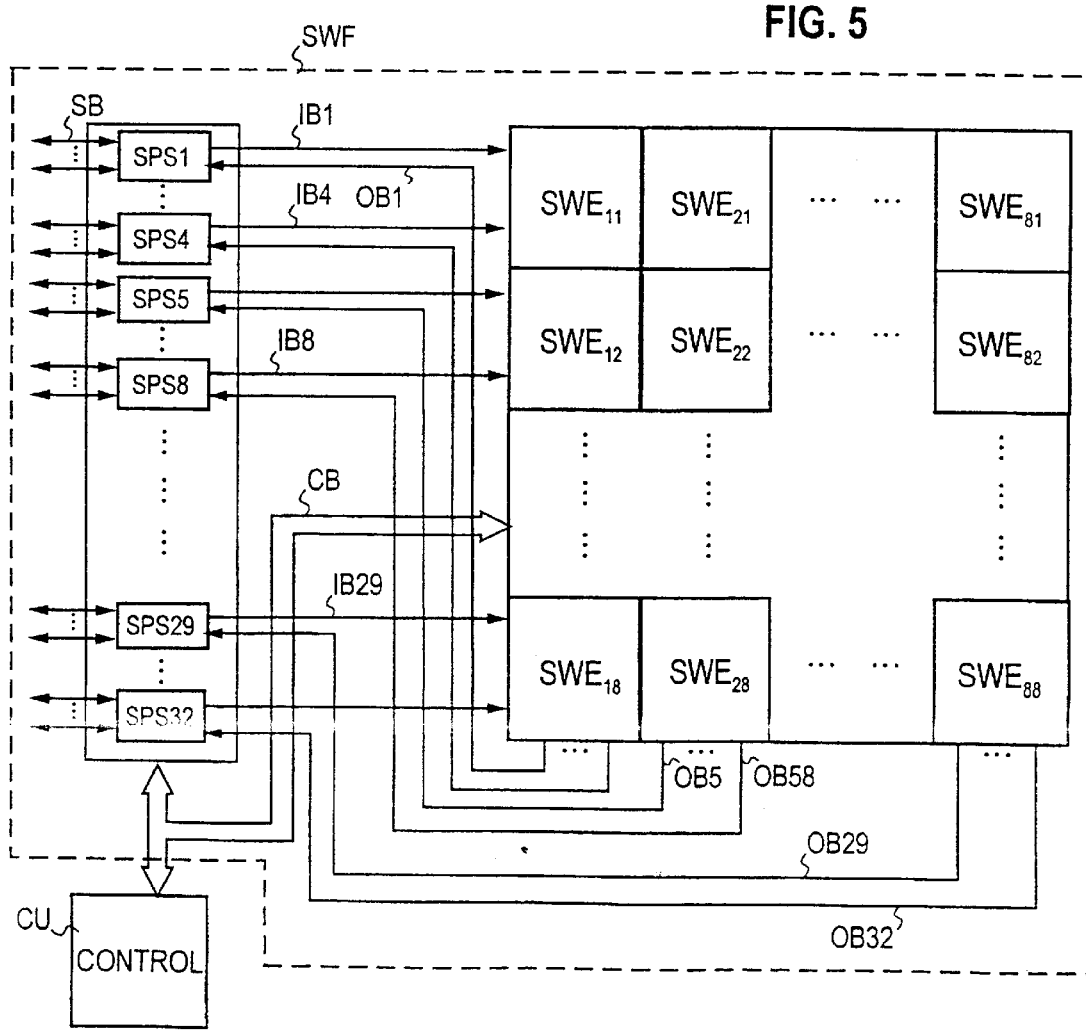

REDUNDANT SWITCHING ARRANGEMENT

This application is a continuation of international application serial number PCT/FI99/00175, filed Mar. 5, 1999.

FIELD OF THE INVENTION

The invention relates to providing redundancy for switching operations regularly carried out in telecommunications systems. In particular, the invention relates to switching elements backed up by redundant units, and specifically to redundant switching networks. In this context, a switching element refers to any unit or system that carries out a switching operation.

BACKGROUND OF THE INVENTION

For example at telephone exchanges, a switching network is the most important single component whose failure may, in the worst case, paralyse the telephone services of a larger number of subscribers. Therefore it is vital that the operation of the switching network can be efficiently controlled and that the operating personnel are immediately notified of any malfunctions to ensure that such malfunctions are quickly located and repaired.

Traditionally, the operation of the switching network has been protected by using two parallel switching networks that serve as mutual spare units. FIG. 1 illustrates this type of switching network arrangement with two parallel switching networks, SWF_A and SWF_B. Normally, the data received at the switching network are connected to the input ports of both switching networks (INAi and INBi, i=1,2, . . . n), and both switching networks operate all the time carrying out switching operations in the same way. As a result, the data fed to the output ports (OUTAi and OUTBi, i=1,2, . . . n) are in normal operation identical. However, only one of the switching networks is, at any given time, selected as the active switching network whose output signals are forwarded.

The operation of an individual switching network (SWF_A or SWF_B) is monitored by performing internal comparative testing controlled by the switching network control unit (CU_A, CU_B). This comparison is carried out (see arrows) by branching off the data of selected output channels (time slots) and that of corresponding input channels (time slots) to the control unit which compares the two sets of data for the duration of several frames. Considering the total number of time slots, the actual number of channels being compared simultaneously is normally very low to ensure that the system does not become too complicated.

One drawback of such a redundant system is that whenever a minor fault occurs in the equipment that induces errors in the data passing through the switching network, this is not noticed until the internal compare test of the switching network happens to compare the input and output channels of that particular switching operation. For example, in a switching network with a maximum capacity of 2048 PCM circuits (2048 2048-kbit/s PCM signals, PCM=Pulse Code Modulation), it takes tens of seconds to identify an error in any single channel.

Another known method of providing redundancy is to use three switching networks in parallel and to compare the output data of all the switching networks. By applying the majority vote principle, the system identifies the switching network(s) that work(s) correctly. However, this is an expensive solution because it requires three identical switching networks.

SUMMARY OF THE INVENTION

The purpose of the invention is to eliminate the said drawbacks and to provide a solution that allows the operation of a switching network or other switching element to be tested quickly and reliably without having to resort to costly hardware.

This goal is achieved by using the solution defined in the independent patent claims.

The idea of the invention is to provide redundancy for a switching network (or other switching element) by doubling and to test the operation of the switching networks by comparing data in corresponding output channels, preferably on a continuous basis. If this first comparison shows that the data in certain corresponding output channels are not identical, one of the switching networks is not operating correctly. Then, an internal compare test is carried out in at least one of the two switching networks. Because the first compare test has already identified the output channel where the error occurred, the internal compare test can be carried out on that particular channel and the corresponding input channel data. Thus, the actual internal compare test is carried out using a known method, but now the affected channels can be selected for comparison immediately. As a result, the outcome of the compare test is obtained immediately and the passive switching network can be quickly activated, if the compare test(s) show(s) that the currently active switching network is faulty.

Another advantage offered by the solution in accordance with the invention is that the inter-network compare test to be added to a known switching network arrangement that uses an internal compare test can be carried out very simply. This is due to the fact that the comparison between the switching networks can be performed without having to save the comparison data because the corresponding output channels are concurrently present at corresponding outputs of the switching networks.

In one preferred embodiment of the invention, the validity of the connection information of both switching networks is checked after the inter-network compare test has revealed a discrepancy relative to the output data from the switching networks. For example, this can be effected by having the control unit read the connection information used by the switching network and compare this information against its own connection information. If the connection information of both switching networks is correct, this is followed by an internal compare test in at least one of the switching networks. If not, an attempt may be made to replace the incorrect connection information by correct data, and failing that, an alarm can be given.

BRIEF DESCRIPTION OF THE DRAWINGS

In the following, the invention and its preferred embodiments are explained in greater detail with reference to FIGS. 2 through 8 based on the examples given in the drawings, where

FIG. 4 illustrates the functional blocks of a known telephone exchange;

FIG. 5 illustrates an implementation of the switching network at the telephone exchange shown in FIG. 4;

DETAILED DESCRIPTION OF THE INVENTION

Figure 1:
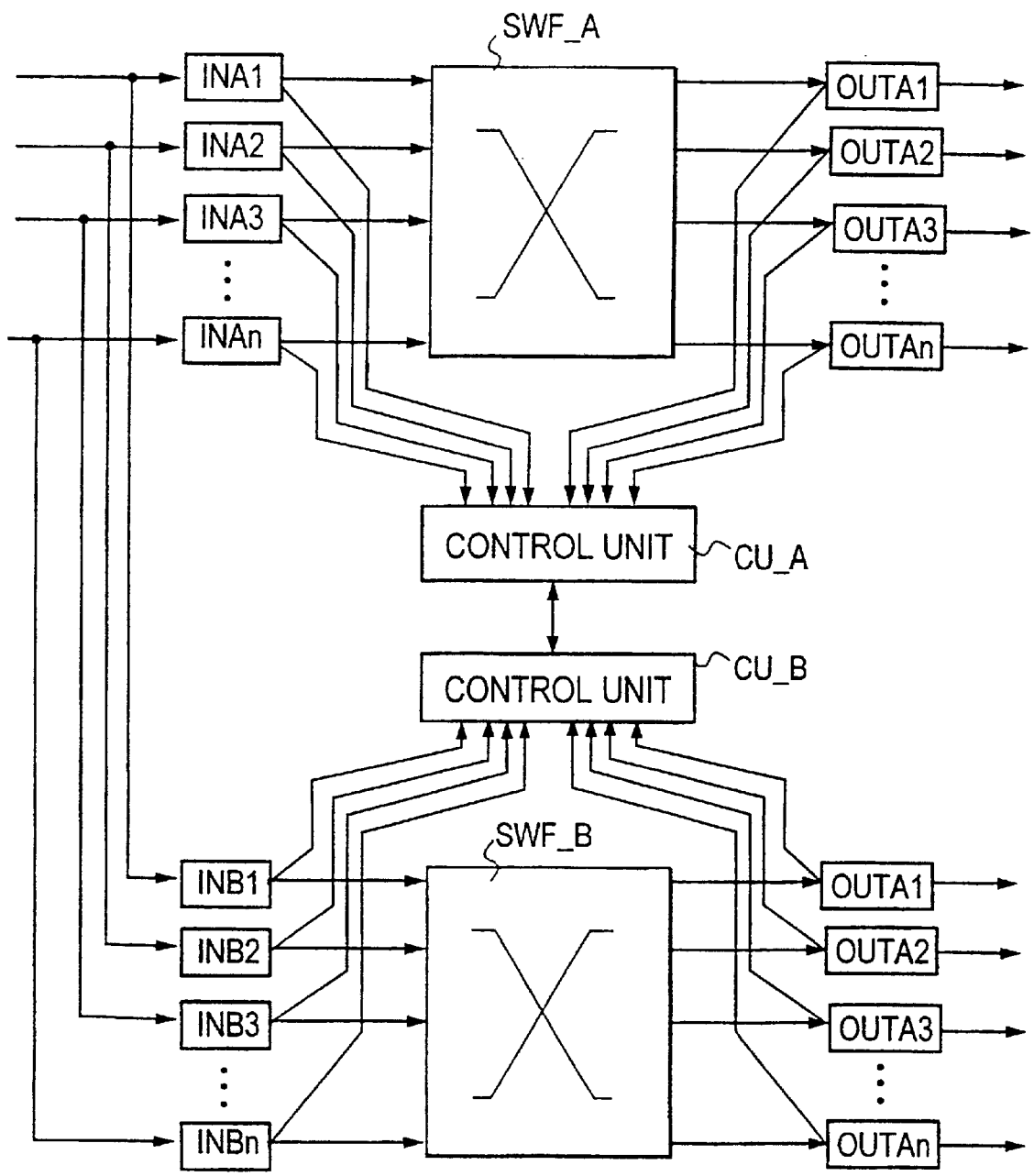
FIG. 1 illustrates a known redundant switching network.
Figure 2A:
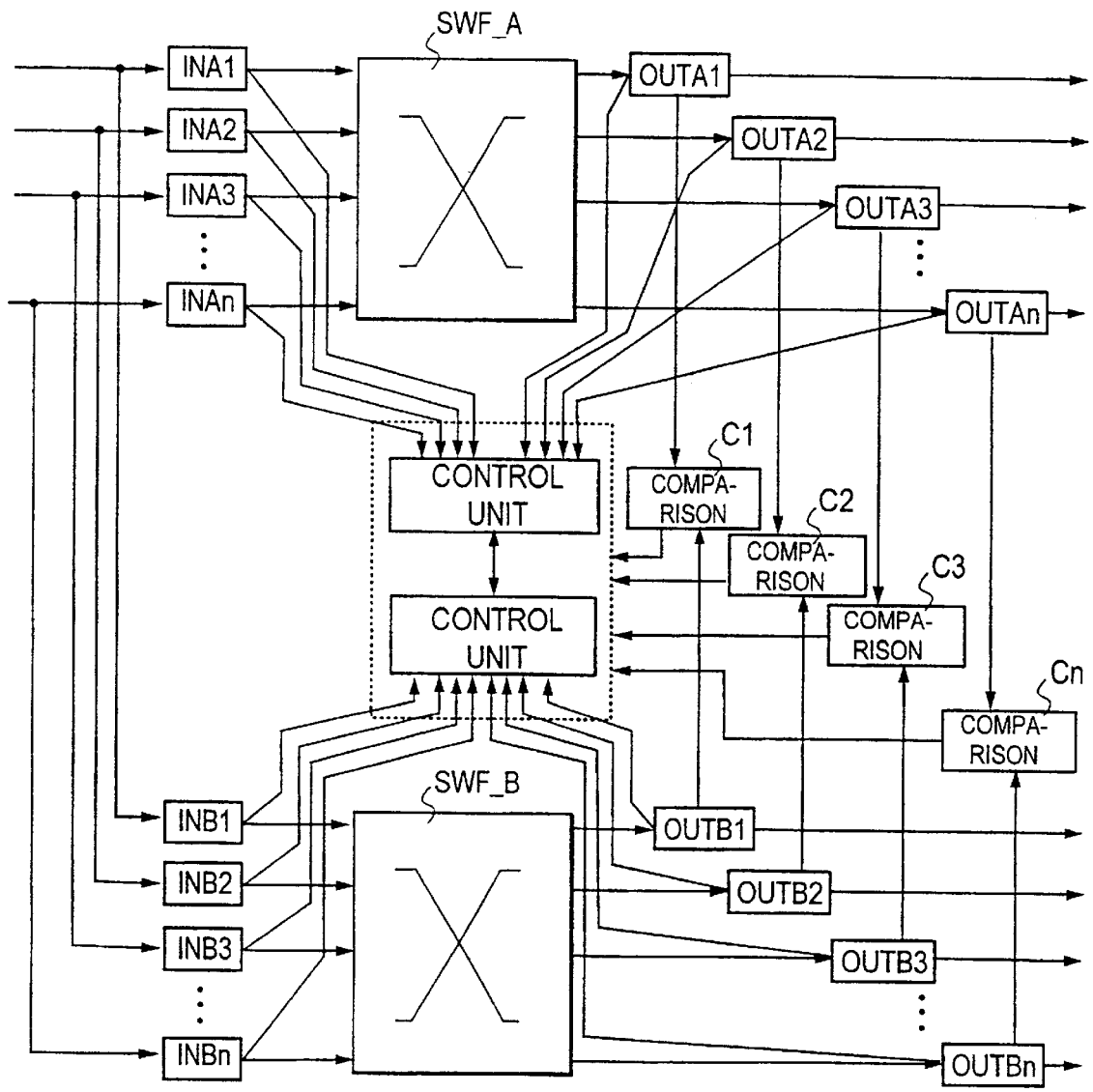
FIG. 2a illustrates a redundant switching network in accordance with the invention.
Figure 2B:
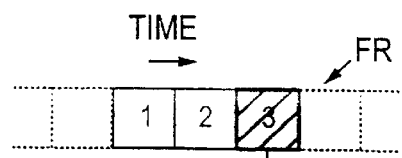
FIG. 2b illustrates comparison of corresponding channels.
Figure 2B:
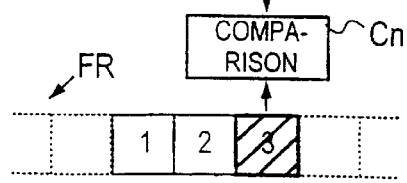
Figure 3:
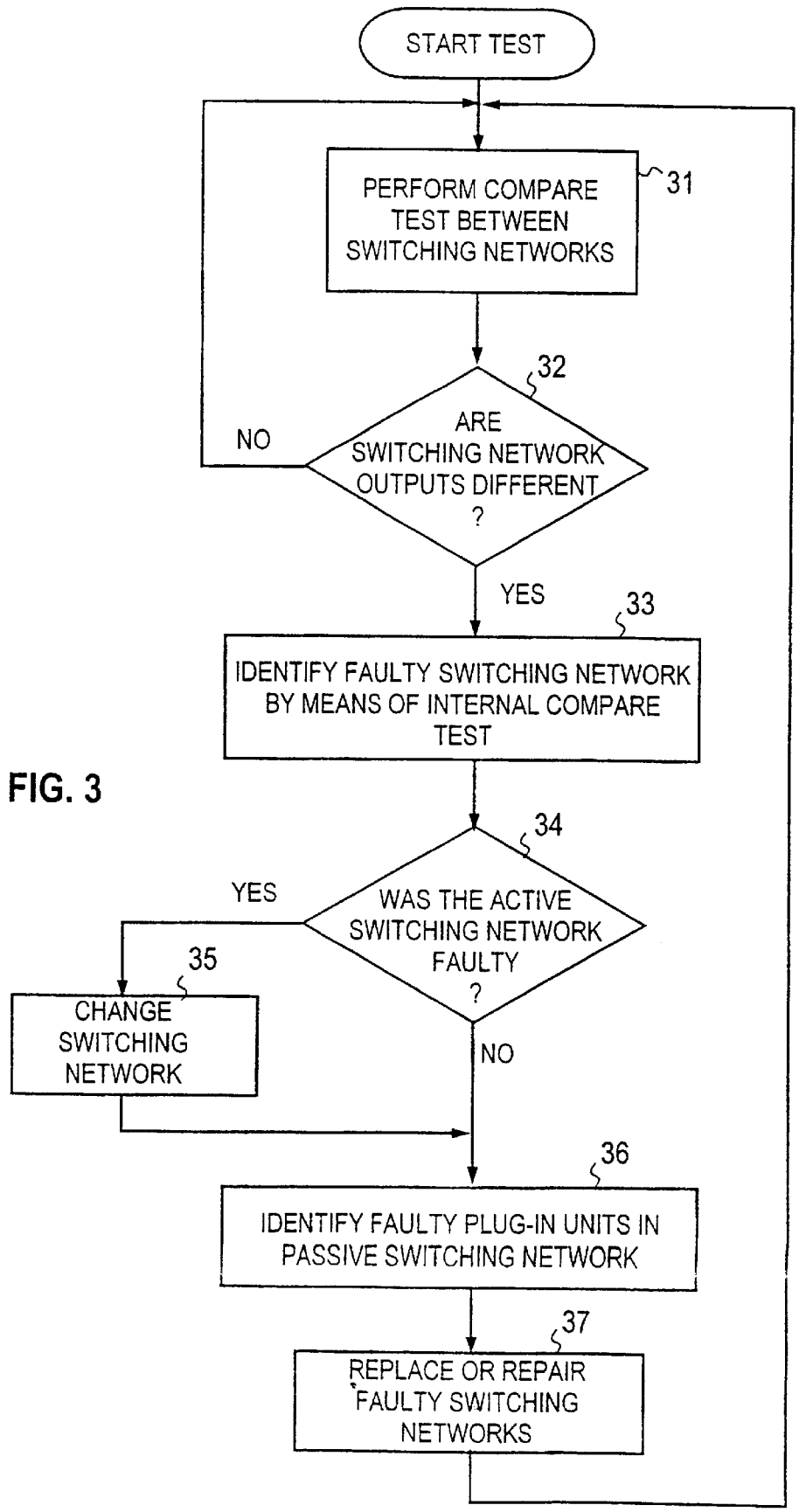
FIG. 3 is a flowchart illustrating the method in accordance with the invention.

In the following, a solution according to the invention is first described on a general level with reference to FIGS. 2a, 2b and 3. FIG. 2a illustrates the switching arrangement shown in FIG. 1 with redundant switching networks, while FIG. 3 is a flowchart illustrating the steps of the method according to the invention. As suggested by the invention, the operation of the switching networks is monitored by comparing the data in two corresponding output channels (comparators C1 . . . Cn, FIG. 2a, and step 31, FIG. 3). FIG. 2b illustrates the comparison of two corresponding output channels assuming that transmission is carried out in successive time slots the number of which per each transmission frame FR is pre-defined. The frames appear in the corresponding output ports in the same phase, and so the corresponding time slots (channels) occur simultaneously and comparison can be carried out without having to save the data in between.

Preferably, comparison between the switching networks is carried out on a continuous basis and if no discrepancy is detected, a new compare test between the switching networks is performed. If a discrepancy is detected between one or more output channel pairs, an internal compare test (FIG. 3, step 33) is carried out in one, but preferably both, switching networks in order to identify the incorrectly operating switching network.

In an internal compare test, the data from the faulty output channel and the data from the input channel corresponding (according to the switching operation used) to that output channel are branched off to the control unit from the input and output ports involved. The switching network where the input and output data differ from each other is faulty.

Once the internal compare test has identified the faulty switching network, the active switching network is deactivated (step 35) and the passive switching network activated, if the fault exists in the active switching network. If, on the other hand, it is determined that the fault lies in the passive switching network, the active switching network is allowed to remain active. Interchanging the switching networks can be effected by having the control unit send a signal to the switching networks and connected units to indicate which switching network is currently active. Thus, the units involved will know the switching network whose signals should be allowed to pass through.

After these steps have been taken, the fault will exist in the passive switching network, making it possible to identify the faulty plug-in units (one or several) (step 36). Following repairs to the defective components (step 37), compare testing between the switching networks can be resumed.

When a discrepancy is detected in one or more output channel pairs, it is possible first to check the switchings before any internal compare test(s) is/are initiated. If the connection information are found to be correct, an internal compare test will be started in at least one of the switching networks. If the connection information are found to be incorrect, the control unit will make an attempt to replace the incorrect connection information with correct data. Failing that, the operating personnel will be alerted. If the connection information can be successfully fixed, compare testing between the switching networks is resumed.

A more detailed description of one embodiment of the invention is provided below using the switching arrangements common in the conventional TDM network as examples.

In conventional TDM (Time Division Multiplexing) networks, data are transmitted as a bit or symbol stream in time slots, each containing a certain number of bits, typically eight. In conventional PCM systems, these bits in any single time slot are all reserved to one and the same channel. For example, in the European 2048 kbit/s basic multiplexing system (where the frame length is 32 time slots, i.e. 256 bits), it is possible to transmit a total of 30 voice channels, each with a capacity of 64 kbit/s. (In the corresponding U.S. system, the number of channels is 24 and the transmission rate 1544 kbit/s.) A description of a solution based on the invention is provided below, adapted to a telephone exchange in a TDM network.

FIG. 4 illustrates the functional blocks of a telephone exchange system as used, for example, in the applicant's DX 210 telephone exchange. The core of the exchange consists of the switching network SWF whose task is to interconnect input and output channels. Switching takes place under the control of the call control unit CAC. The call control unit CAC is in charge of all decision making relating to call control. The larger DX 220 exchange, also manufactured by the applicant, makes use of decentralised call control by distributing the functions required for call control between several computer units. Data between these units are transmitted via the message bus MB. Operation and maintenance of the exchange is effected by means of the operation and maintenance unit OMU. Peripheral equipment such as display terminals and printers are connected to the operation and maintenance unit.

Subscribers are connected to the exchange by means of subscriber modules SUB. The interface can be a standard analog interface or a digital ISDN interface. The subscriber modules carry out the A/D and D/A conversions required for analog interfaces and handle signalling operations between the subscriber terminal (telephone) and the exchange.

The exchange is connected to other exchanges or remote subscriber stages by means of trunk circuit interfaces ET. The external interface of the exchange conforms to the CCITT (currently ITU-T) G.700 series recommendations.

In a system as described above, the switching network SWF can, for example, be designed as shown in FIG. 5. The design is identical to that used in the applicant's DX 210 and DX 220 exchanges. The structural components of the switching network are the converter units SPSi (i=1 . . . 32) and switching blocks $SWE_{ij}$ (i=1 . . . 8, j=1 . . . 8). In practice, the control unit of the switching network consists of four plug-in units, but, for the sake of simplicity, the figure only shows one shared control unit CU (which is part of the call control unit CAC shown in FIG. 4).

Data are transmitted between the subscriber modules SUB and the converter units via the 4 Mbit/s serial buses SB, numbering 32 per converter unit. Each 4 Mbit/s serial bus contains the contents of two 2 Mbit/s PCM circuits multiplexed on a time division basis (64 kbit/s channels). The data used for testing in accordance with the invention are branched off at this 4 Mbit/s interface, as will be explained below. As a result, the capacity of the switching network used as the example is 2×32×32=2048 PCM circuits (2048 2048 kbit/s PCM signals).

The 4 Mbit/s serial buses from the subscriber modules are converted by serial-to-parallel converters into a single parallel bus with a capacity of 16.384 Mbytes/s. The parallel bus IBi (i=1 . . . 32) from each converter unit connects to eight switching blocks shown in the figure on the same horizontal line. The parallel buses from converter units SPS1 . . . SPS4 connect to switching blocks $SWE_{i1}$ (i=1 . . . 8), those from converter units SPS5 . . . SPS8 to the switching blocks $SWE_{i2}$ (i=1 . . . 8), and so on, and the parallel buses from converter units SPS29 . . . SPS32 to switching blocks $SWE_{i8}$ (i=1 . . . 8). Consequently, there are a total of four parallel buses from four separate converter units to each switching block (one from each converter unit).

Conversely, there are a total of four (16.384 Mbit/s) parallel buses from each switching block to four separate converter units (one to each unit). The switching blocks shown in the figure on the same vertical line drive the same output bus that connects to one converter unit. In other words, switching blocks $SWE_{1j}$ (j=1 . . . 8) drive bus OB1 that connects to converter unit SPS1, bus OB2 that connects to converter unit SPS2, bus OB8 that connects to converter unit SPS3, and bus OB4 that connects to converter unit SPS4, while switching blocks $SWE_{2j}$ (j=1 . . . 8) drive bus OB5 that connects to converter unit SPS5, bus OB6 that connects to converter unit SPS6, bus OB7 that connects to converter unit SPS7, and bus OB8 that connects to converter unit SPS8, and so on, and switching blocks $SWE_{8j}$ (j=1 . . . 8) drive bus OB29 that connects to converter unit SPS29, bus OB30 that connects to converter unit SPS30, bus OB31 that connects to converter unit SPS31, and bus OB32 that connects to converter unit SPS32.

At each individual converter unit, the 4 Mbit/s serial buses (numbering 32) are formed from the parallel bus coming from the switching blocks by performing a parallel-to-serial conversion on the incoming data.

Thus, each converter unit transmits to eight different switching blocks (shown on the same horizontal line in the figure) and receives from eight switching blocks (shown on the same vertical line in the figure), making it possible to switch any incoming time slot to any outgoing time slot.

Control unit CU connects directly to each converter unit and each switching block via control bus CB.

The switching blocks $SWE_{ij}$ receive and transmit data via the said parallel buses. In the switching block, the incoming parallel data are written cyclically, byte by byte, to the switching memory. In the outgoing direction of transmission, data transmission is controlled by the control memory in the switching block, to which the control unit has written, via the control bus, the road address for the switchings to be made. The control memory is read cyclically in time with the outgoing time slots. The read address in the control memory indicates the address in the switching memory from which the data for the time slot involved should be read. Thus, the actual cross-connection is effected using a known method.

Figure 6:
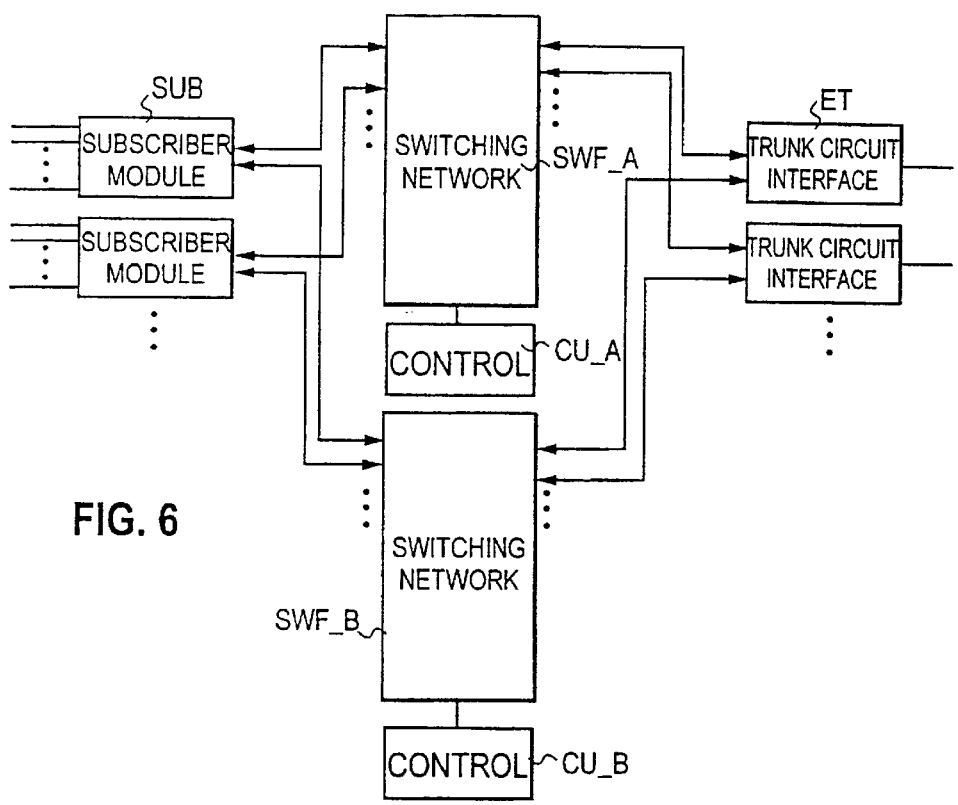
FIG. 6 shows the telephone exchange of FIG. 4 with a backed-up switching network.

When the method in accordance with the invention is used, the switching network, as described above, is backed-up by providing redundancy as shown in FIG. 6, where there are two parallel switching networks (SWF_A and SWF_B) as shown in FIG. 5, one of which is selected for active operation. The units (SUB, ET) connecting to the switching network select the data transmitted by the active network. In this example, both switching networks have their own control units.

Figure 7:
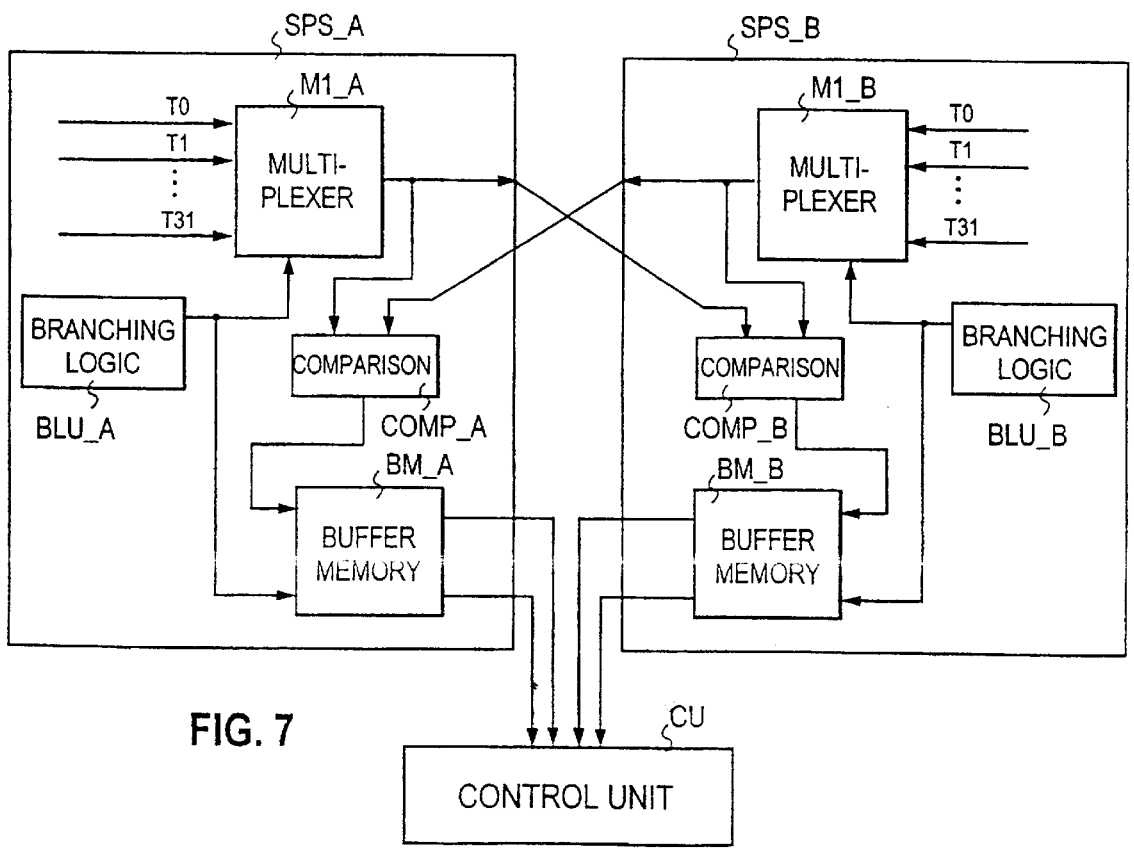
FIG. 7 illustrates the performance of the compare test between switching networks in the switching network shown in FIG. 5.

FIG. 7 illustrates one way of applying inter-network comparison to the type of switching network described in the foregoing. As indicated above, this comparison can, for example, be carried out in the converter units. All the functions in the various converter units are identical, so that the following explanation applies to both switching networks. In the figure, the elements belonging to the first switching network (SWF_A) are denoted by the letter A and the elements belonging to the second switching network (SWF_B) by the letter B.

The PCM signals from an individual converter unit towards the subscriber module, numbering 32 in this example, are denoted by T0 . . . T31. For comparison, these signals are branched off to a separate multiplexer M1 to whose output one incoming signal at a time is connected for the duration of one frame (125 $\mu$s). The multiplexer output is connected both to the first input of the own comparison unit COMP and to the second input of the comparison unit in a converter unit belonging to the other switching network. In this example, the converter units SPS_A and SPS_B are interconnected by two 4 Mbit/s interfaces. Multiplexer M1 is controlled by a branching logic unit BLU, which is used to select the signal to be compared at any given time. The branching logic units are synchronised to ensure that they always select the same signal.

Comparison unit COMP compares corresponding channels during one frame, after which it analyses the corresponding channels of the following (4 Mbit/s) signal. Thus, the comparison unit carries out comparison for 64 channel pairs during a single frame. As a result, all the channels can be checked during 32 frames. This also means that an error in any signal is detected within a period of time equivalent to the duration of 32 frames, if not earlier (which is a short time compared with the conventional solution). The serial data coming in from multiplexer M1 are stored, after which comparison is carried out byte by byte (channel by channel) using a known method. The comparison unit indicates whether the bytes in the corresponding channels differ from one another. This item of data is written to the buffer memory BM together with the data indicating the channel involved. The latter data are obtained from the branching logic unit. Thus, the buffer memory receives information, channel by channel, as to whether the contents of each channel are identical in both switching networks.

Control unit CU reads the contents of the buffer memory via control bus CB, and if it detects an error (discrepancy) in any outgoing channel pair, it starts the internal compare test for the switching networks. Because the control unit is aware of the switchings to be made, it is capable of targeting the compare test to the output channel suspected of failure and the corresponding input channel. The control unit reads the contents of the buffer memories of all the converter units during one frame.

In the examples detailed above, 1 signal out of 32 is selected at any one time for comparison. This helps to achieve a compromise between the speed of detection of a fault and the complexity of the equipment. If faults are to be detected more quickly, several signals must be compared simultaneously. This also calls for increased data transmission capacity between the converter unit and the control unit.

Because both switching networks basically include identical hardware, the compare test between the switching networks can be carried out in both switching networks. However, since the output channels of only the active switching networks are used, it is natural that use is only made of the compare test result of the active switching network. Thus, the control unit of the active switching network gives the control unit of the passive switching network the command to start the internal compare test within that switching network. However, a compare test between the switching networks can only be performed in one of the switching networks (the same applies to the internal compare test within the switching network).

Figure 8:
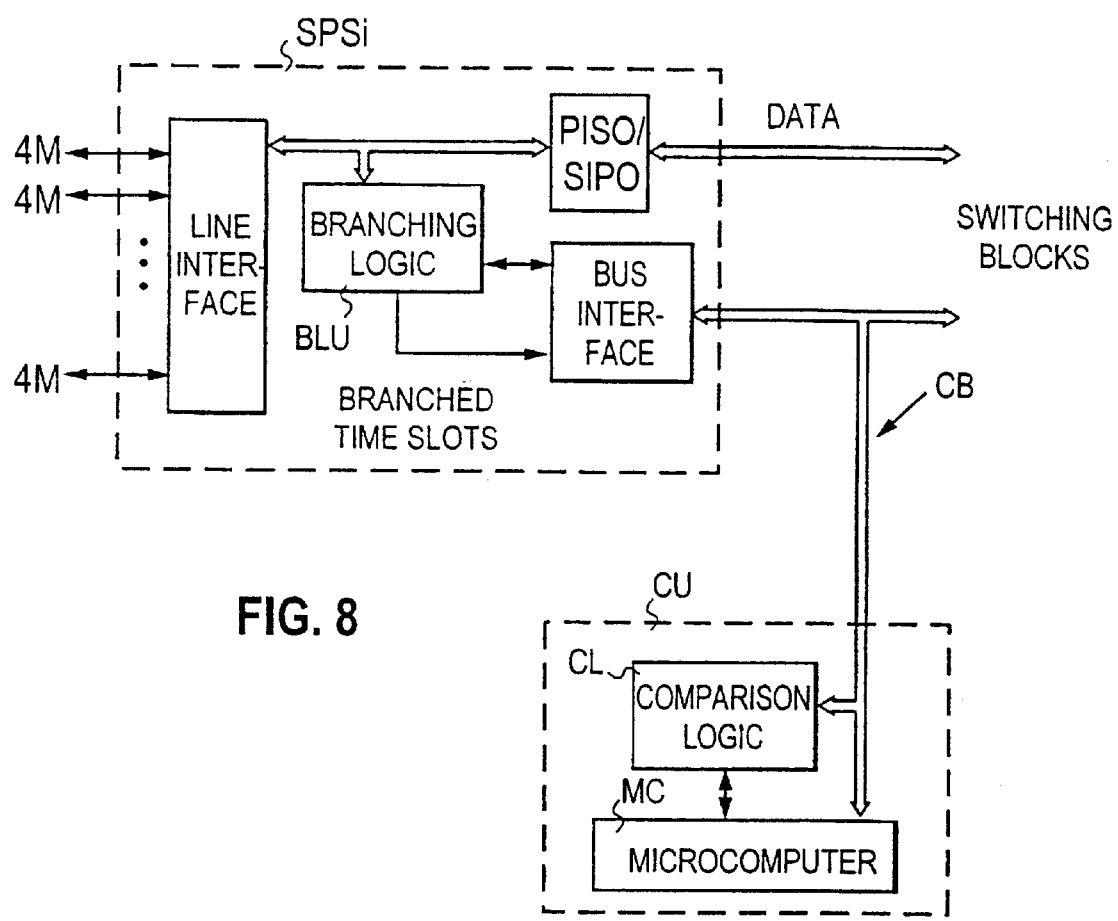
FIG. 8 illustrates the performance of the internal compare test in the switching network shown in FIG. 5.

The principle of the internal compare test is illustrated in FIG. 8 for one converter unit SPSi. The test works in the same way for other converter units also.

Comparison between the input and output channels is carried out by switching network control unit CU, not by the converter unit, as in the compare test between the switching networks. To start comparison, the control unit gives a branching command via control bus CB to the converter unit SPSi corresponding to the input and output channel (i=1 . . . 32 and may have 1 or 2 values). In response to the branching command, the converter unit branching logic BLU branches off the time slots involved to the control unit via the control bus. In the control unit, comparison logic CL compares the contents of the input and output channels corresponding to the switching involved. The comparison logic reports the results of the test to the control unit microcomputer MC which makes the decision on the further action required.

Testing of the faulty passive switching network can, for example, be carried out using the through-connection test. This test differs from the internal compare test of the switching networks in that the converter unit transmits a test byte assigned by the control unit to the time slots coming into the switching network. The control unit starts the through-connection test by writing the test byte to the converter unit test register (not shown) via control bus CB. The outgoing time slots of the connection to be tested are branched off from the converter unit via the control bus to the control unit whose comparison logic compares the contents of the outgoing time slot to the test byte transmitted to the converter unit corresponding to the incoming time slot. In other words, branching and comparison of time slots is carried out using the same principle as in internal compare testing, except that incoming time slots are not branched off to the control unit because the contents of the incoming time slots (test bytes) are already known to the control unit.

FIGS. 7 and 8 show, on a general level, only those components that are essential to the performance of the tests. For example, in addition to branching logic, FIG. 8 only shows, for the converter unit, the interfaces that carry out the parallel-to-serial conversion (PISO) on the side of the switching blocks, and the serial-to-parallel conversion (SIPO) in the opposite direction of transmission. Moreover, the same branching logic (BLU) is shown performing branching for both tests.

Both in the compare test between switching networks and in the switching network internal compare test, it is preferable to carry out the comparison by comparing the bytes or bit sequences involved directly. However, it is also possible to perform, this comparison indirectly by using some function to compute a provisional result, such as a check sum, from the bytes or bit sequences to be compared and then comparing these provisional results. The same applies to the through-connection test.

Although the invention has in the foregoing been explained with reference to the examples shown in the attached drawings, it is clear that the invention is not limited to these embodiments but can be varied within the scope of the basic idea of the invention as presented in the enclosed patent claims. For example, even though the principle based on the invention has been described above in connection with a switching network used in a TDM network, the same principle can be used to provide redundancy for a switching network in a packet-switched network, such as ATM network. In such a case, the packets or cells of one virtual connection are compared at corresponding output ports, and if any discrepancy is detected, the packets (or cells) are then compared at the output and input ports of both switching networks (the packet present at the input port is compared with the same packet at the output port). Also, the compare test between switching networks or the internal compare test need not necessarily be carried out in both switching networks, but both tests can be carried out in only one of the two switching networks. If the (internal) test performed in the switching network (or in its control unit) gives the correct result, it is clear that the fault lies in the other switching network (and vice versa). Comparisons can also be carried out outside the actual switching network, as explained above for the internal compare test. Nor is the solution according to the invention tied to providing the entire switching network, but the same principle can be applied to any element performing switching operations, such as a switching element in the switching network. Therefore, the term 'switching element' used in the enclosed patent claims must be understood as covering a range of options. Switching networks (or elements) may also share a single control unit backed-up by a redundant unit.

What is claimed is:

1. A method for implementing a redundant switching arrangement, the method including the steps of using a first and a second switching element (SWF_A, SWF_B), both of which include at least one input port and at least one output port, and performing switching operations by means of the two switching elements in an identical manner, so that one of the switching elements operates as an active switching element whose switching operations are utilised and the other switching element operates as a passive switching element serving as a spare unit for the active switching element, characterized in that the operation of the switching elements is monitored by comparing the data of the corresponding output channels of the first and second switching elements, and if the comparison shows that the data contained in any two corresponding output channels are not identical, performing an internal test on at least one of the switching elements to verify the data in the output channels involved, and selecting the switching element serving as the active switching element on the basis of such internal test(s).

2. A method according to claim 1, characterized by comparing the data of the corresponding output channels of the first and second switching element essentially continuously.

3. A method according to claim 1, characterized in that, in the internal test, the data of the output channel involved are directly compared with the data of the corresponding input channel.

4. A method according to claim 1, characterized in that when comparison reveals discrepancies in the contents of certain corresponding output channels, the correctness of the connection information is first verified in both switching elements before any internal test is carried out, and said at least one internal test is performed only if the connection information prove to be correct.

5. A method according to claim 1, characterized in that the data of the corresponding output channels of the first and second switching element are compared at least in one of the switching elements.

6. A method according to claim 1, characterized in that the data of the corresponding output channels of the first and second switching element are compared in both switching elements, but only the result of comparison provided by the active switching element is used as a basis for decision-making.

7. A method according to claims 1, characterized in that, for the comparison of the data of the corresponding output channels, some of the output channels in both switching elements are branched off to be compared, and that the channels to be branched off are changed cyclically.

8. A redundant switching arrangement for a telecommunications network, the switching arrangement comprising a first switching element (SWF_A) including at least one input port and at least one output port, and a second switching element (SWF_B) including at least one input port and at least one output port and configured to perform switching in the same manner as the first switching element, and first comparison means (CL, MC) for performing an internal compare test for at least one of the switching elements to verify the data of the selected output channel, characterized in that the arrangement further comprises second comparison means (COMP_A, COMP_B) for comparing the data of the corresponding output channels of the first and second switching element and that the first comparison means are responsive to the second comparison means for carrying out an internal compare test in a way dependent on the result of the comparison performed by the second comparison means.

9. A switching arrangement according to claim 8, characterized in that the second comparison means are in both switching elements.

10. A switching arrangement according to claim 8, characterized in that it includes multiplexing means (M1) to whose inputs output channels are connected and whose output is connected to the second comparison means for connecting some of the output channels at any one time to the second comparison means, and selection means (BLU) controlling the multiplexing means for selecting the output channels to be connected to the output of the multiplexing means at any given time.

* * * * *